(12) United States Patent
Payton

(10) Patent No.: US 6,193,311 B1
(45) Date of Patent: Feb. 27, 2001

(54) INFANT VEHICLE SEAT

(76) Inventor: Michael W. Payton, 526 Kiowa Rd., P.O. Box 1024, Florissant, CO (US) 80816

( * ) Notice: Subject to any disclaimer, the term of this patent is extended or adjusted under 35 U.S.C. 154(b) by 0 days.

(21) Appl. No.: 09/498,813

(22) Filed: Feb. 7, 2000

(51) Int. Cl.⁷ ........................................................ A47C 1/08
(52) U.S. Cl. .................... 297/256.15; 297/250.1
(58) Field of Search ........................... 297/250.1, 256.15, 297/216.11, 464, 487

(56) References Cited

U.S. PATENT DOCUMENTS

| | | | |
|---|---|---|---|
| 4,311,339 | * | 1/1982 | Heath . |
| 5,054,853 | * | 10/1991 | Gillies et al. . |
| 5,662,379 | * | 9/1997 | Zimelman . |
| 5,800,012 | * | 9/1998 | Ziegler . |
| 5,857,751 | * | 1/1999 | Koledin . |
| 5,895,092 | * | 4/1999 | Fischer . |
| 6,045,183 | * | 4/2000 | Weber . |

* cited by examiner

Primary Examiner—Milton Nelson, Jr.
(74) Attorney, Agent, or Firm—G. F. Gallinger

(57) ABSTRACT

An infant seat is disclosed which comprises: a seat/back member having opposite side portions; a frontal frame having opposite side portions each pivoted and releasably attached to a corresponding side portion of the integral seat/back member; a harness connected to the opposite side portions of the frontal frame and extending therebetween to restrain an infant seated in the vehicle seat when the frontal frame is attached thereto; and, a releasable frame lock for securing the frontal frame to the seat/back member. Most preferably the releasable frame lock is only accessible from a back portion of the seat so that an infant secured in the seat can not release himself therefrom. An airbag restraining guard is carried by opposite side portions of the frame to protect an infant against a rapidly expanding airbag in the vehicle.

14 Claims, 1 Drawing Sheet

INFANT VEHICLE SEAT

FIELD OF INVENTION

This invention relates to infant seats used to hold and protect infants in vehicles. More particularly this invention relates to an improved infant seat which will more securely hold an infant in everyday us, more safely restrain an infant in a collision, and additionally offer protection to the infant against a rapidly expanding air bag in a collision.

BACKGROUND OF THE INVENTION

The applicant commenced this application before an accident in which his vehicle was struck from the side. His son was strapped in a car seat and died due to head injuries. Prior to the accident the applicant's son had learned how to disengage himself from his car seat while travelling. The applicant was also concerned about the high likelihood of his vehicle's airbags causing severe injury or death to his son in the event of a collision. He has developed an infant seat which better secures an infant in the seat during normal use as well as in the event of a collision; affords the infant protection against a rapidly expanding airbag in the event of a collision; and additionally, offers head protection against lateral thrust sustained in a collision.

OBJECTS AND STATEMENT OF INVENTION

It is an object of this invention to disclose an infant vehicle seat which secures an infant so that the infant when seated in the vehicle seat cannot release or otherwise extricate himself from the seat. It is yet a further object of this invention to disclose an infant vehicle seat which will more uniformly restrain the body of an infant in the event of a vehicle collision. It is a final object of this invention to disclose an infant vehicle seat which will protect an infant against injury and death caused either by lateral thrust sustained in a collision or a rapidly expanding air bag.

One aspect of this invention provides for an infant seat comprising: a seat/back member having opposite side portions; a frontal frame having opposite side portions releasably attached to a corresponding side portion of the integral seat/back member; a harness connected to the opposite side portions of the frontal frame and extending therebetween to restrain an infant seated in the vehicle seat when the frontal frame is attached thereto; and, releasable frame lock means for securing the frontal frame to the seat/back member.

Another aspect of this invention provides for a seat as above wherein the bottom opposite portions of the frame are pivoted to corresponding side portions of the seat/back member and wherein the releasable lock means secures a top portion of the frame to the seat/back member.

Yet another aspect of this invention comprises an invention as above further comprising an airbag restraining guard carried by opposite side portions of the frame.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
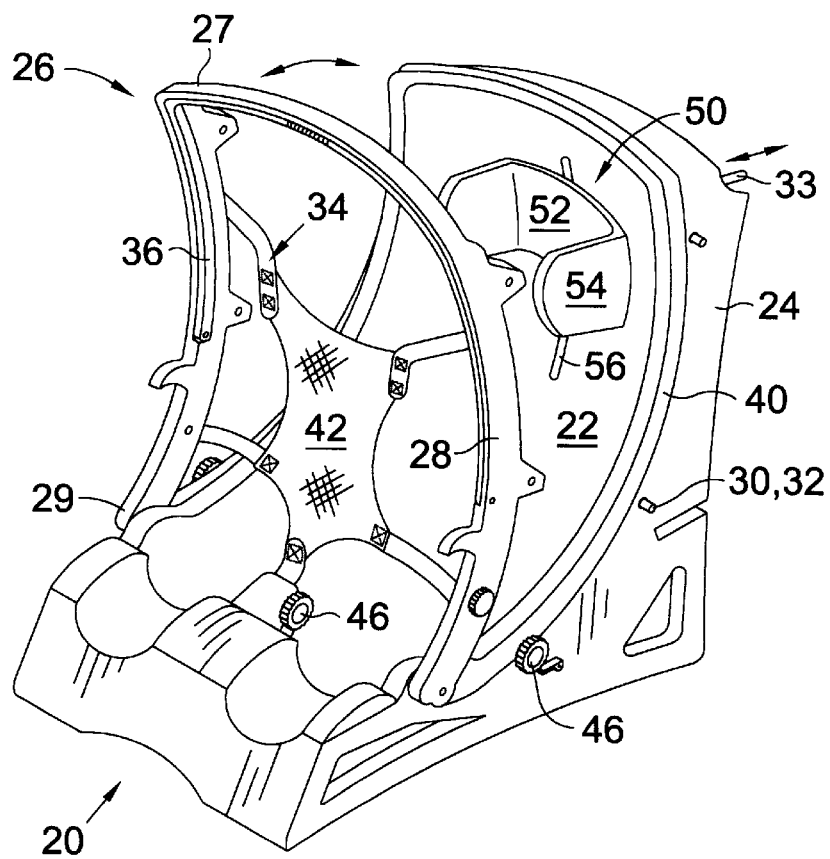
FIG. 1 is a perspective view of an infant vehicle seat in an open position to receive an infant.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of an infant vehicle seat 20 in an open position to receive an infant. The infant seat 20 comprises: a seat/back member 22 having opposite side portions 24; a frontal frame 26 having opposite side portions 28 releasably attached to a corresponding side portion of the integral seat/back member 22; a harness 34 connected to the opposite side portions 28 of the frontal frame 26 and extending therebetween to restrain an infant seated in the vehicle seat 20; and, releasable frame lock means 30 for securing the frontal frame 26 to the seat/back member 22.

Figure 2:
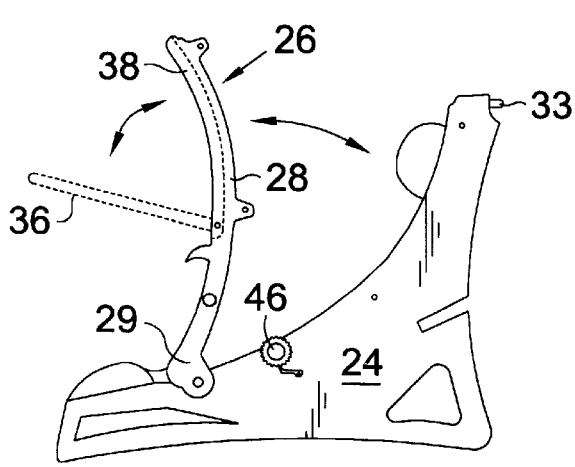
FIG. 2 is an elevational view of the infant vehicle seat shown in FIG. 1 having its airbag guard in a lowered, operational position.
Figure 3:
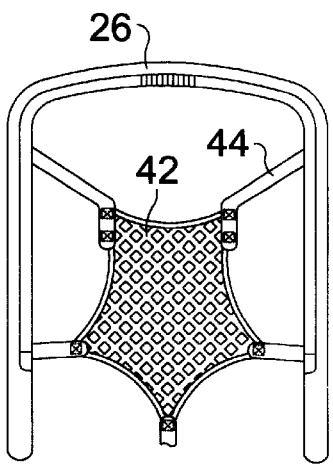
FIG. 3 is a partial front view of the infant vehicle seat which shows the pivoting frame.

FIG. 2 is an elevational view of the infant vehicle seat 20 shown in FIG. 1 having its airbag guard 36 in a lowered, operational position. The frontal frame 26 has a top end portion 27 and bottom end portion 29; most preferably the bottom opposite portions 29 of the frame 26 are pivoted to corresponding side portions of the seat/back member. Most preferably the releasable frame lock means 30 secures a top portion 27 of the frame 26 to the seat/back member 22.

In a preferred embodiment of the invention an airbag restraining guard 36 is carried by opposite side portions 28 of the frame 26. The guard 36 comprises a U-shaped member having opposite ends which are pivotably attached to opposite side portions 28 of the frontal frame 26. In the most preferred embodiment of the invention the frontal frame member 26 is also generally U-shaped, and when the guard 36 is in a closed inoperable position, a central portion of the U-shaped guard 36 generally aligns with a top portion of the frame 26. The frontal frame 26 has a recessed corner portion 38 to receive the guard 36 when it is in a closed inoperable position. In the most preferred embodiment of the invention a frontal portion of the seat/back member 22 also has a recessed corner portion 40 to receive the frame 26 when it is in a closed restraining position.

Most preferably the releasable lock means 30 comprises retractable pins 32 retracted by a lever pin 33 positioned behind the seat 20 so that an infant secured in the seat could not release himself therefrom.

The central portion of the harness 34 comprises a net 42. The net 42 is secured to the frontal frame 26 by a strap 44 which may be adjusted for length. Most preferably the adjustment of the strap for length comprises a ratchet and dog mechanism 46 so that the harness 34 may be readily tightened on an infant in the vehicle seat 20.

In a preferred embodiment of the invention, the invention further comprises a U shaped member 50 having a central portion 52, and side wing portions 54. The central portion 52 is centrally positioned and attached to the seat/back member 22 so that the central portion of the U shaped member is positioned behind an infant's head (not shown) and the side wing portions of the U shaped member extend along opposite sides of the infant's head. In the event of lateral thrust produced in an accident, the side portions of the U shaped member restrain the infant's head from lateral movement. Most preferably, the U shaped member 50 is slidably attached 56 to the seat/back member 22 so that the U shaped member 50 may be adjusted vertically for height to accomodate a growing infant.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. An infant seat comprising:
   an integral seat/back member having a top end portion, an opposite bottom end portion, and two opposite side portions;
   a frontal frame having a top end portion, an opposite bottom end portion, and two opposite side portions, one portion thereof pivoted to a corresponding portion of the seat/back member, and an opposite portion thereof releasably attached to a corresponding portion of the integral seat/back member;
   a harness connected to the opposite side portions of the frontal frame and extending therebetween to restrain an infant seated in the infant seat; and, releasable frame lock means for securing the frontal frame to the seat/back member.

2. A seat as in claim 1 wherein opposite bottom portions of the frame are pivoted to corresponding opposite bottom portions of the seat/back member and wherein the releasable frame lock means secures a top portion of the frame to the seat/back member.

3. A seat as in claim 1 wherein the central portion of the harness comprises a net.

4. A seat as in claim 3 wherein the net is secured to the frontal frame by a strap which may be adjusted for length.

5. A seat as in claim 4 wherein the adjustment of the strap length comprises a ratchet and dog mechanism so that the harness may be readily tightened on an infant in the vehicle seat.

6. A seat as in claim 1 further comprising and, two side wing portions each extending forwardly from an opposite side portion of the seat/back member adapted to restrain an infant's head therebetween.

7. A seat as in claim 6 wherein the two side wing portions further comprise a U shaped member having a central portion and two opposite wing portions; and wherein said U shaped member is configured so that the central portion is positionable behind an infant's head and attached to the seat/back member and the wing portions of the U shaped member extendable along opposite sides of the infant's head so that in event of lateral thrust caused by a collision the wing portions of the U shaped member restrain the infant's head from lateral movement.

8. A seat as in claim 6 wherein a U shaped member is slidably attached to the seat/back member so that it may be adjusted vertically for height to accomodate a growing infant.

9. A seat as in claim 1 further comprising an airbag restraining guard carried by opposite side portions of the frame.

10. A seat as in claim 9 wherein the guard comprises a U-shaped member having ends which are pivotably attached to opposite side portions of the frontal frame.

11. A seat as in claim 9 wherein the frontal frame is generally U-shaped, and wherein a central portion of the U-shaped guard generally aligns with a top portion of the frame when the guard is in a closed inoperable position.

12. A seat as in claim 11 wherein the frontal frame has a recessed corner portion to receive the guard when it is in a closed inoperable position.

13. A seat as in claim 12 wherein a frontal portion of the seat/back member has a recessed corner portion to receive the frame when it is in a closed restraining position.

14. A seat as in claim 13 wherein the releasable lock means comprises retractable pins retracted by a lever pin positioned behind the seat so that an infant secured in the seat could not release himself therefrom.

* * * * *